US009411386B2

(12) United States Patent
Sauerwein, Jr.

(10) Patent No.: US 9,411,386 B2
(45) Date of Patent: Aug. 9, 2016

(54) MOBILE DEVICE WITH TAMPER DETECTION

(75) Inventor: James T. Sauerwein, Jr., Charlotte, NC (US)

(73) Assignee: Hand Held Products, Inc., Fort Mill, SC (US)

( * ) Notice: Subject to any disclaimer, the term of this patent is extended or adjusted under 35 U.S.C. 154(b) by 378 days.

(21) Appl. No.: 13/285,756

(22) Filed: Oct. 31, 2011

(65) Prior Publication Data

US 2013/0111227 A1  May 2, 2013

(51) Int. Cl.
  *G06F 1/26* (2006.01)
  *G06F 21/00* (2013.01)

(52) U.S. Cl.
  CPC . *G06F 1/26* (2013.01); *G06F 21/00* (2013.01)

(58) Field of Classification Search
  CPC .................................. G01F 1/26; G01F 21/00
  USPC ...................... 340/7.32; 455/127.1, 572–574,
                455/343.1–343.6; 73/300–340;
                713/300–340; 361/679.55
  See application file for complete search history.

(56) References Cited

U.S. PATENT DOCUMENTS

| 5,107,286 A * | 4/1992 | Sergeant et al. ................ 396/26 |
| 5,508,505 A * | 4/1996 | Walts et al. ............. 235/462.46 |
| 6,109,528 A * | 8/2000 | Kunert et al. ............ 235/472.01 |
| 6,621,039 B2 * | 9/2003 | Wang et al. ................ 219/121.6 |
| 7,171,186 B2 * | 1/2007 | Miyachi et al. ............ 455/343.5 |
| 7,571,468 B1 * | 8/2009 | Williams ................ G06F 21/34 713/184 |
| 8,310,604 B2 * | 11/2012 | Delmonico et al. .......... 348/748 |
| 2008/0091605 A1 * | 4/2008 | Hughes ................... G06F 21/31 705/51 |
| 2008/0123262 A1 | 5/2008 | Coleman et al. |
| 2008/0252084 A1 * | 10/2008 | Francis et al. ................ 292/317 |
| 2009/0305397 A1 * | 12/2009 | Dodgson et al. ........... 435/305.3 |
| 2011/0154077 A1 * | 6/2011 | Wasamoto et al. .......... 713/322 |
| 2012/0077454 A1 * | 3/2012 | Paddon et al. ............ 455/404.1 |

* cited by examiner

*Primary Examiner* — Jennifer Mehmood
*Assistant Examiner* — Omar Casillashernandez
(74) *Attorney, Agent, or Firm* — Additon, Higgins & Pendleton, P.A.

(57) ABSTRACT

Systems and methods for operating mobile devices having one or more environmental sensing systems for disrupting battery power.

15 Claims, 5 Drawing Sheets

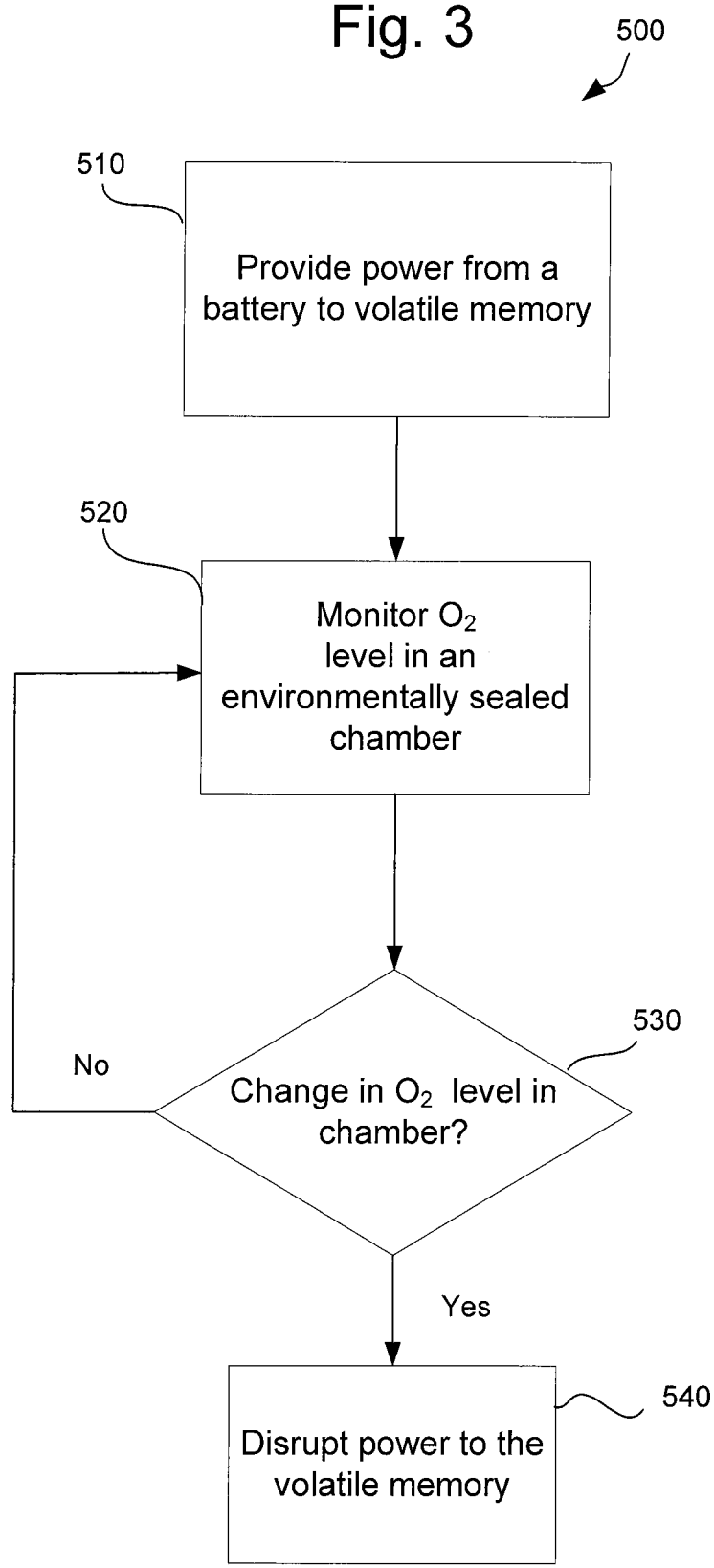

MOBILE DEVICE WITH TAMPER DETECTION

BACKGROUND

Mobile devices (also referred to as smart phones, handheld devices, handheld computers, PDAs, PDTs, etc.) are widely used worldwide, and may be described as pocket-sized computing devices, typically having a display screen with touch input or a miniature keypad. In some mobile devices the input and output are combined into a touch-screen interface. Mobile devices are popular because they provide the assistance and convenience of a conventional computer (laptop, notebook or otherwise) in environments where carrying one would not be practical. Enterprise digital assistants further extend the available functionality of mobile devices.

An Enterprise digital assistant (EDA) is a handheld computer adapted for usage with SME (Small to Medium Enterprise) and Enterprise business Application software|Applications as a data capture mobile device. Such data capture applications include indicia readers, biometrics, magnetic stripe, smart card and RFID data capture technologies used within communication networks such as WLANs (Wireless Local Area Networks), Bluetooth, Wide area network|WAN/LAN/Personal Area Network|PAN voice and data communications, VoIP and GPRS Edge Communications.

A mobile device generally comprises a mobile computer, a keypad and a data acquisition device. The mobile computer generally comprises a hand held (or "pocket") computing device. Keypads come in a variety of alpha-numeric and numeric configurations. The data acquisition device generally comprises a device that captures data from, for example, radio frequency IDs (RFID), images, and bar codes. Data may also be captured via keypad entry and utilization of a touch pad associated with the mobile computer.

Efforts regarding such systems have led to continuing developments to improve their versatility, practicality and efficiency.

BRIEF DESCRIPTION OF THE DRAWINGS

FIG. 3 is an exemplary flowchart for operating a mobile device.

Figure 1A:
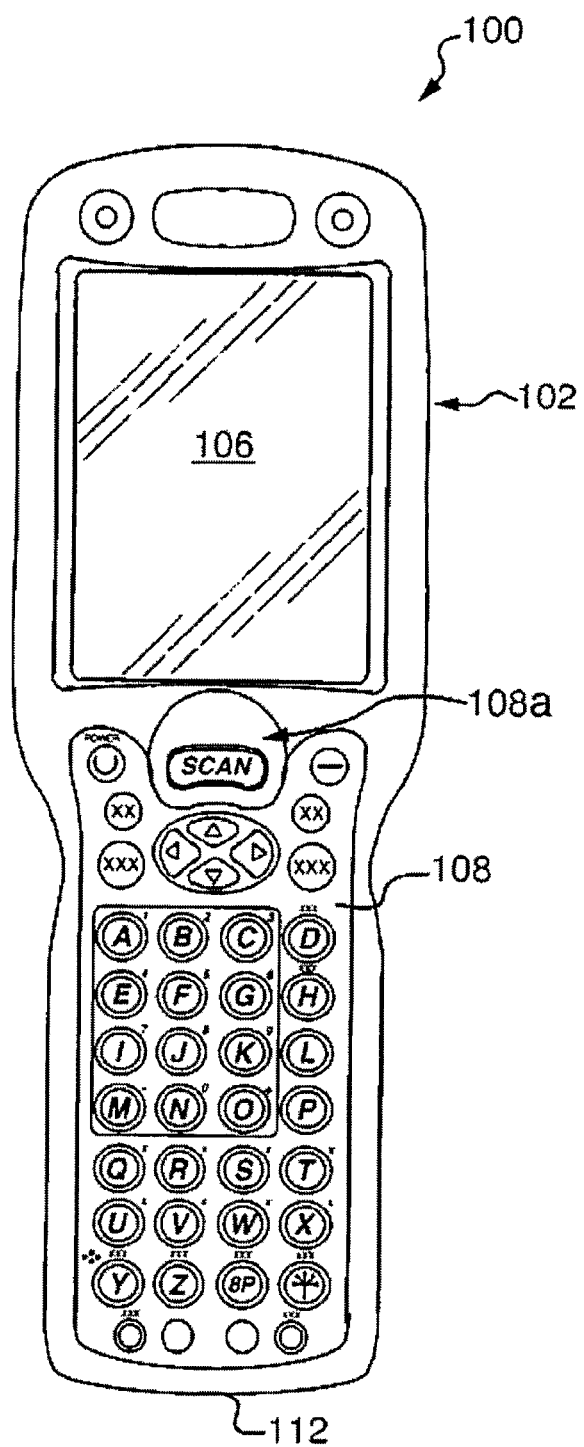
FIG. 1a is a top plan view of an exemplary mobile device.

It will be appreciated that for purposes of clarity and where deemed appropriate, reference numerals repeated in the figures may indicate corresponding features. Also, the relative size of various objects in the drawings may in some cases be distorted to more clearly show exemplary embodiments.

DETAILED DESCRIPTION

Reference will now be made in detail to examples of which are illustrated in the accompanying drawings, wherein like reference numerals refer to like elements throughout. The following description will use nomenclature associated with a mobile device, however those of ordinary skill in the art will recognize that exemplary embodiments are applicable to a variety of other portable devices including: personal data assistants (PDAs); bar code scanners; consumer electronics (including portable radios, televisions and phones); and the like. It is anticipated that many such portable devices would benefit from the embodiments thereof described herein. It is to be noted that an element number followed by a letter generally indicates multiple occurrences of similar, either in structure or function elements. Further, the use of an italicized "n" (e.g. n) associated with an element number generally denotes either an unspecified one of such elements or a partial or complete group of such elements—the meaning of which is to be drawn from the context of such use.

The term Portable data terminal (PDT) refers to data collection devices used to collect, process, and transfer data to a larger data processing system. Most PDTs are ruggedized to some extent for use in industrial environments. The tougher the environment, the more robust the PDT. PDT's are available from several sources, including the assignee of the present application.

A method is here, and generally, conceived to be a sequence of steps or actions leading to a desired result and may be implemented as software. While it may prove convenient to discuss such software as if were embodied by a single program, most implementations will distribute the described functions among discrete (and some not so discrete) pieces of software. These pieces are often described using such terms of art as "programs," "objects," "functions," "subroutines," "libraries," ".dlls," "APIs," and "procedures." While one or more of these terms may find favor in the present description, there is no intention to limitations to the described configurations.

In general, the sequences of steps in the present methods require physical manipulation of physical quantities. These quantities take the form of optical, electrical or magnetic signals capable of being stored, transferred, combined, compared or otherwise manipulated. Those of ordinary skill in the art conveniently refer to these signals as "bits", "values", "elements", "symbols", "characters", "images", "terms", "numbers", or the like. It should be recognized that these and similar terms are to be associated with the appropriate physical quantities and are merely convenient labels applied to these quantities.

With respect to the software described herein, those of ordinary skill in the art will recognize that there exist a variety of platforms and languages for creating software for performing the methods outlined herein. Embodiments may be implemented using MICROSOFT VISUAL STUDIO or any number of varieties of C. However, those of ordinary skill in the art also recognize that the choice of the exact platform and language is often dictated by the specifics of the actual system constructed, such that what may work for one type of system may not be efficient on another system. It should also be understood that the methods described herein are not limited to being executed as software on a computer or DSP (Digital Signal Processor), but can also be implemented in a hardware processor. For example, the methods could be implemented with HDL (Hardware Design Language) in an ASIC.

In the present description, an element number followed by a letter generally indicates multiple occurrences of similar, either in structure or function, elements. Further, the use of an italicized "n" (e.g. n) associated with an element number generally denotes either an unspecified one of such elements or a partial or complete group of such elements, the meaning of which is to be drawn from the context of such use.

Figure 1B:
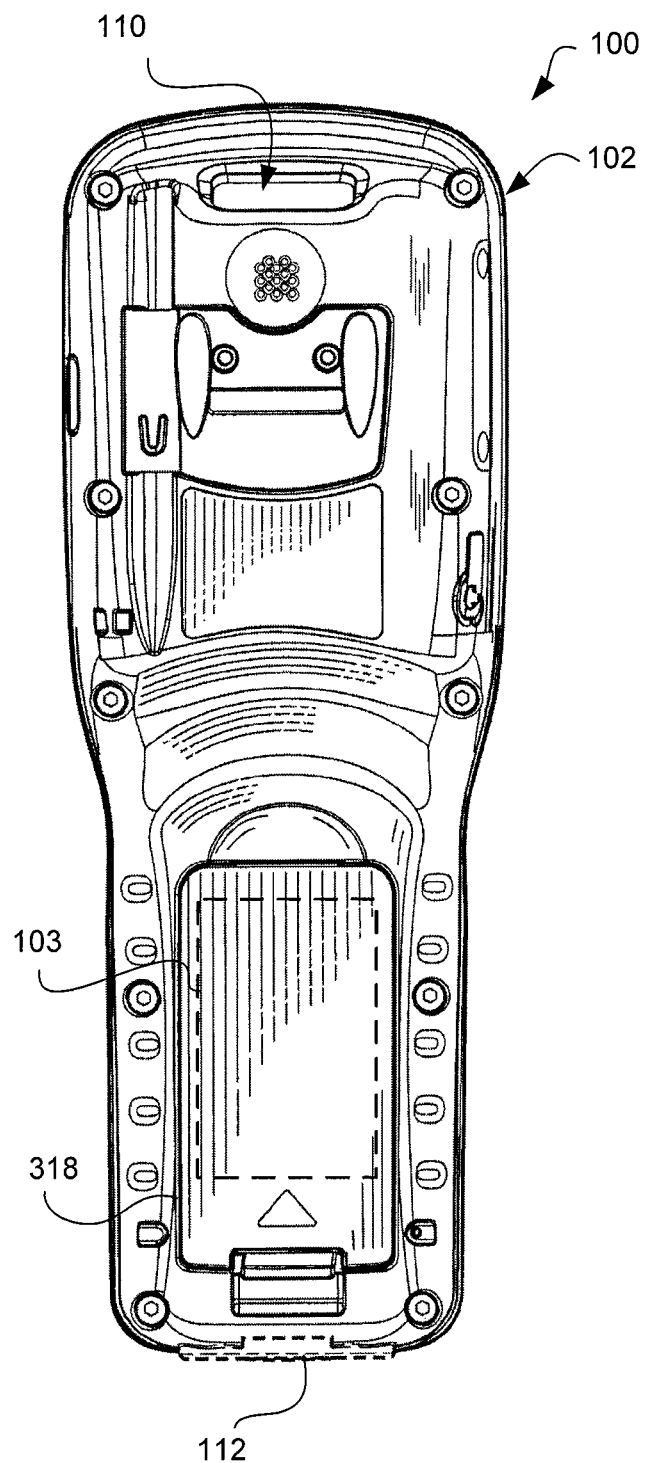
FIG. 1b is a bottom plan view of an exemplary mobile device
Figure 1C:
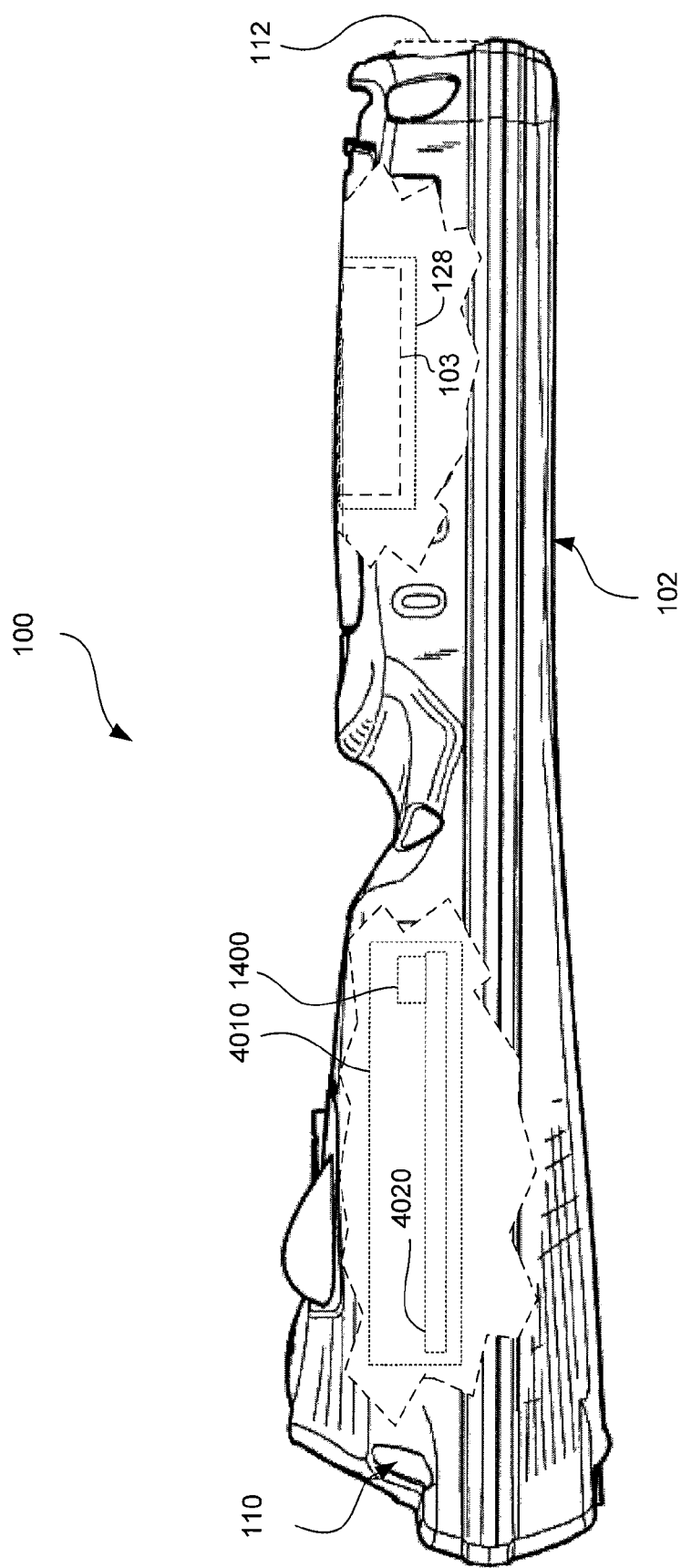
FIG. 1c is a side view, partially cutaway, of an exemplary mobile device.

FIGS. 1a, 1b and 1c are views of a known mobile device 100. The illustrated example utilizes a popular form factor incorporating a body or housing 102. The body 102 generally supports a variety of components, including: a battery pack 103; an LCD with associated touch screen 106 providing a graphic user interface; a keyboard 108 (including a scan button 108a); a scan engine 110; and a data/charging port 112 (not fully illustrated). The scan engine 110 may comprise, for example, an image engine or a laser engine. The data/charging port 112 typically comprises an interface with one set of pins or pads for the transmitting and receiving of data and a second set of pins or pads for receiving power for powering the system and/or charging the battery.

In use, the user may actuate either the scan key 108a or a trigger to initiate an image capture via the image engine 110. The captured image is analyzed. e.g. decoded to identify the data it represents. The decoded data is stored and possibly displayed on the mobile device 100. Additional processing of the data may take place on the mobile device 100 and/or a data processing resource to which the data is transmitted via any available transport mechanism on the mobile device 100. Some examples of known transport mechanisms utilized by mobile devices include: Bluetooth, WiFi, GSM, CDMA, USB, IrDA, removable FLASH memory, parallel and serial ports (including for example, RS-232).

The battery pack 103 generally comprises a housing, one or more cells, and associated circuitry. The battery pack 103 may be located in a battery well 128. Electrically, an array of contacts (not shown) and a switch (not shown) are provided in the well. The array of electrical contacts are situated on the floor of the well. The electrical contacts may be spring biased to ensure adequate communication with the electrical contact. The switch may be engaged by a portion of a battery access panel 318. The switch may have a variety of configurations, for example it may utilize similar mechanical components as a keypad or a comprise a variety of detection circuits, e.g. mechanical, optical or magnetic. The function of the switch is to provide an indication when the battery access panel is removed.

The battery pack may be spring loaded in the well utilizing one or more spring mechanisms to assist in holding the battery pack stable until removal is initiated.

In an exemplary embodiment, the housing of the battery pack 103 forms a portion of the surface of the housing 102. The battery pack 103 has a longitudinal orientation matching the longitudinal axis of the housing 102.

As a further feature, the well may be molded to have a limited number of egress points to provide water or environmental resistance. Gaskets may be utilized to render the well resistant to water. By making the well water resistant, and making the battery water resistant, the interface between the battery access panel and the well need not be made water resistant. This may reduce the cost and complexity of the mobile device.

Figure 2:
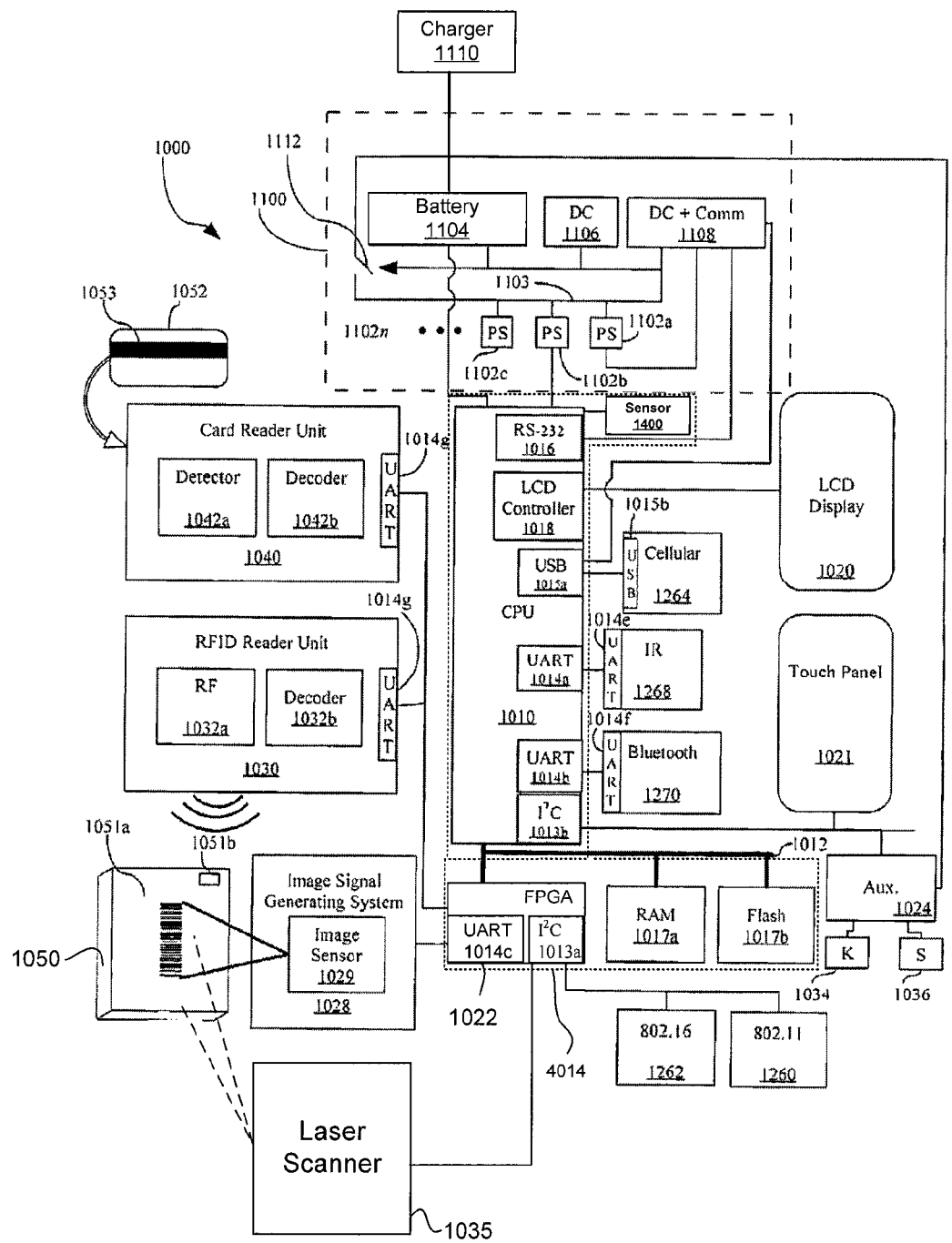
FIG. 2 is a block schematic diagram of an exemplary mobile device.

FIG. 2 is a simplified block diagram of an exemplary mobile device 1000 which may include a number of sub-systems such as a central processing unit (CPU) 1010 which receives data from and outputs data to other sub-systems for storage, transmission and additional processing. CPU 1010 may be implemented using any number of off the shelf solutions including: embedded processors; general purpose processors; custom solutions such as pre-configured field programmable gate arrays (FPGAs) and application specific integrated circuits (ASICs). Overall operation of the CPU 1010 may be controlled by software or firmware, typically referred to as an operating system, stored in one or more memory locations 1017n, including RAM 1017a and FLASH memory 1017b. One or more of the memory locations may be volatile memory that requires power to maintain stored information. Exemplary forms of volatile storage are random access memory (RAM), including dynamic random access memory (DRAM) and static random access memory (SRAM).

A sensor 1400 may be utilized to provide input utilized to control one or more components or subsystems of the mobile device. For example, sensor 1400 may be a sensor that detects one or more environmental or physical changes applied to or affecting the device or subsystems within the device.

Communication to and from the CPU 1010 and the various sub-components may be via one or more ports or busses, including a main system bus 1012; I$^2$C busses 1013a and 1013b; a plurality of Universal Asynchronous Receivers/Transmitter (UART) ports 1014n, a Universal Serial Bus (USB) 1015n, and an RS-232 port 1016.

The illustrated CPU 1010 may include a liquid crystal display (LCD) controller 1018 for controlling an LCD 1020. A touch sensitive panel 1021, which may be in communication with one or more of the CPU 1010 and an auxiliary processor 1024 via the I2C bus 1013b, may be associated with the LCD 1020 for receipt of data thereon. The combination of the LCD 1020 and the touch sensitive panel 1021 is often referred to as a "touch screen."

A variety of secondary processors may be provided to perform general and application specific functions. The example illustrated in FIG. 3 provides two such processors: a field programmable gate array (FPGA) 1022 and an auxiliary processor 1024. The auxiliary processor 1024 may comprise any number of embedded (or general purpose) processors.

The auxiliary processor 1024 may interface with and control a variety of data input devices including, for example, the touch panel 1021, a keyboard 1034 and a scan button 1036. By way of example, the mobile device 1000 may be configured so that displayed menu options are selected by physically depressing a key on the keyboard 1034 or activating the touch screen 1021 with use of a finger or stylus. The scan button 1036 may be used for initiating and controlling the various data collection systems, such as an image signal generating system 1028, an RFID sensing system 1030, or a magnetic stripe reader 1040.

The data collection systems (e.g. the image signal generating system 1028, the RFID sensing system 1030, and the magnetic stripe reader 1050) may be controlled by one or more of the CPU 1010, the auxiliary processor 1024, and the FPGA 1022. In this case, the FPGA 1022 initiates and controls the operation of the data collection systems and accumulates data received there from prior to depositing such data in memory 1017n.

The image signal generating system 1028 generally comprises a two dimensional solid state image sensor 1029 utilizing such technologies as CCD, CMOS, and CID, for capturing an image containing data, e.g. a bar code or signature. Two-dimensional solid state image sensors generally have a plurality of photo sensor picture elements ("pixels") which are formed in a pattern including a plurality of rows and a plurality of columns of pixels. The image signal generating system 1028 further includes an imaging optics (not shown) focusing an image onto an active surface of the image sensor 1029. Image sensor 1029 may be incorporated on an image sensor IC chip having disposed thereon image sensor control circuitry, image signal conditioning circuitry, and an analog-to-digital converter. FPGA 1022 manages the capture and transfer of image data into RAM 1017n. Decoding may be performed by the CPU 1010 or any suitable secondary processor. A variety of alternatives, including a dedicated laser barcode scanner 1035 may also be utilized.

One use of the image signal generating system 1028 is for reading and interpreting bar codes such as bar code 1051a on an item 1050. For this operation, when the scan button 1036 is actuated, the CPU 1010 causes the appropriate control signals to be sent to the image sensor 1029. In response thereto, the image sensor 1029 outputs digital image data including (hopefully) an adequate representation of the bar code symbol 1050. The digital image data is streamed to the FPGA 1022 where it is collected and subsequently deposited in memory 1017n. In accordance with a decoding program (not specifically illustrated) an attempt may be made to decode the bar code represented in the captured electronic image representation. The capture and decoding of image data may occur automatically in response to a trigger signal being generated, usually by activation of the scan button 1036 or a pre-selected key on keyboard 1034. For example, the CPU 1010 may be configured, typically through execution of a program resident in memory 1017n, to continuously capture and decode bar code symbols represented therein as long as scan button 1036 is actuated. The cycle may be terminated upon successfully decoding the bar code symbol or by timing out after a number of unsuccessful attempts.

In addition to having a decode operation, the image signal generation system 1028 may also be configured for an image capture operation. In an image capture operation, control circuit 1010 captures an electronic image representation in response to the scan button 1036 being actuated without attempting to decode a decodable symbol represented therein. The captured electronic image representation may be one or more of (i) stored into a designated memory location of memory 1017n, (ii) transmitted to an external spaced apart device, or (iii) displayed on LCD 1020. This mode may be used to capture, for example an image of a signature or damage to a package.

In an image capture operation, the image signal generation system 1028 may be operated in two distinct stages: aiming and final capture. During the aiming stage, frames output by the image signal generation system 1028 are displayed on the LCD display 1020. These frames are not saved. Once a user is satisfied with the content of the image displayed on the LCD display 1020, he or she initiates the final capture stage. In final capture stage, a frame (either the frame currently in the buffer or a next frame) is saved and typically displayed on the LCD 1020. Generally, the aiming stage is initiated by pressing a designated button (such as a scan button 1036) with the final capture stage being initiated by releasing the designated button. It is generally desirable to display frames as quickly as possible in the aiming stage to ensure that the user is viewing a recently outputted frame. Otherwise there is a danger that the frame the user views when deciding to initiate capture is outdated and does not accurately reflect what the image signal generating system 1028 is currently outputting (and what will be captured in final capture stage).

The RFID reader unit 1030 may include an RF oscillation and receiver circuit 1032a and a data decode processing circuit 1032b. RFID reader unit 1030 may be configured to read RF encoded data from a passive RFID tag, such as tag 1051b, which may be disposed on article 1050.

Where the RFID reader unit 1032a is configured to read RF encoded data from a passive RFID tag, the RF oscillation and receiver circuit 1032a transmits a carrier signal to the passive tag which in turn converts the carrier energy to voltage form and actuates a transponder (not shown) to transmit a radio signal representing the encoded tag data. The RF oscillator and receiver circuit 1032a, in turn, receives the radio signal from the tag and converts the data into a digital format. The data decode processing circuit 1032b, typically including a low cost microcontroller IC chip, decodes the received radio signal information received by RF oscillator and receiver circuit 1032a to decode the encoded identification data originally encoded into RFID tag.

RFID reader unit 1030 may, for example, operate in a selective activation mode or in a continuous read operating mode. In a selective activation mode RFID reader unit 1030 broadcasts radio signals in an attempt to activate a tag or tags in its vicinity in response to an RFID trigger signal being received. In a continuous read mode, RFID reader module 1030 continuously broadcasts radio signals in an attempt to actuate a tag or tags in proximity with unit automatically, without module 1030 receiving a trigger signal. Mobile device 1000 may be configured so that the CPU 1010 recognizes a trigger signal under numerous conditions, such as: (1) a trigger is actuated: (2) an RFID trigger instruction is received from a remote device; or (3) the CPU 1010 determines that a predetermined condition has been satisfied.

Still further, the mobile device 1000 may include a card reader unit 1040 for reading data from a card 1052. Card reader unit 1040 generally comprises a signal detection circuit 1042a and a data decode circuit 1042b. In operation, the signal detection circuit 1042a detects data, from for example a magnetic strip 1053 on a card 1052. Subsequently, the data decode circuit 1042b decodes the data. The decoded data may be transmitted to the CPU 1010 for further processing via the FPGA 1022. The card reader unit 1040 can be selected to be of a type that reads card information encoded in more than one data format, such as magnetic stripe data, smart card or Integrated circuit card (IC card) data, and RF transmitted data.

The mobile device 1000 may further include a plurality of wireless communication system links such as an 802.11 communication link 1260, an 802.16 communication link 1262, a communication link 1264 for communication with a cellular network such as a network in accordance with the Global System for Mobile Communications (GSM), an IR communication link 1268, and a Bluetooth communication link 1270. Each of these links facilitates communication with a remote device and may be used to transfer and receive data.

An exemplary power circuit 1100 supplies power to the mobile device 1000. The power circuit 1100 generally comprises a series of power regulators 1102n that regulate the power supplied to the various components of the mobile device 1000. The power regulators 1102n each generally comprise step up or step down circuits which are in turn connected to each of the various components in the mobile device 1000 that require the particular voltage output by that power regulator 1102n.

The power regulators receive current from a power bus 1103 which is, in turn, supplied by an exemplary power source 1104, a first power input 1106 or a connector 1108 that includes a second power input. The first power input 1106 may comprise a DC power jack, for example, a 2.5 mm coaxial DC power plug which receives 9.5 volts from a conventional AC/DC transformer. The connector 1108 may comprise any number of known connection technologies. Certain pins of the connector 1108 may be dedicated to receiving DC power while other pins are dedicated to one or more communication paths, such as RS-232 and USB. It may also prove advantageous to provide DC power out, for example from a power supply 1102a, so as to power tethered accessories, such as external magnetic stripe or RFID readers (not shown). It may prove further advantageous to add circuitry to insulate the first power input 1106 from the second power input on the connector 1108 and other components in the mobile device 1000 in the event that a user attempts to supply power to both power inputs.

The power source 1104 may be charged by a charge circuit 1110 which receives power from either the first power input 1106 or the second power input on the connector 1108. Control may be provided to the CPU 1010 which may modify the charging behavior of the charge circuit 1110 based on information generated by the auxiliary processor 1024. In an exemplary embodiment, the auxiliary processor 1024 monitors parameters via an interface. A switch 1112 may control the power source based upon the presence of power from the first power input 1106 or the second power input on the connector 1108. Thus, when an external power supply is connected to either the power input 1106 or the second power input on the connector 1108, the power source is isolated from the power regulators 1102n and may be charged via the charge circuit 1110. Once power is removed from the power input 1106 and the connector 1108, the power source is connected to the power regulators 1102n.

An exemplary power source 1104 may be comprised of an energy storage system with a rapid or short charge cycle, such as a fuel cell which is at least one open electrochemical cell comprised of an anode and cathode separated by an electrolyte that converts a source fuel into an electrical current and water. It generates electricity inside a cell through reactions between a fuel and an oxidant, triggered in the presence of an electrolyte. The reactants flow into the cell, and the reaction products flow out of it, while the electrolyte remains within it. Fuel cells are thermodynamically open electrochemical cell systems that consume a reactant from an external source, which must be replenished. Many combinations of fuels and oxidants are possible. A hydrogen fuel cell uses hydrogen as its fuel and oxygen as its oxidant. Other fuels may include hydrocarbons and alcohols. Other oxidants may include chlorine and chlorine dioxide.

In an exemplary, power source 1104 may be comprised of a hybrid battery pack comprising a fuel cell and a thermodynamically closed electrochemical cell battery, such as a NiMh, NiCd, Li Ion, or Li Polymer cell battery connected to generate a single output voltage Vout.

A thermodynamically closed electrochemical cell battery, such as a NiMh, NiCd, Li Ion, or Li Polymer cell batteries generally provide the ability to drive short duration, high current loads while fuel cells provide space and weight advantages.

In another exemplary, power source 1104 may be comprised of a hybrid battery pack comprising a fuel cell and a thermodynamically closed electrochemical cell battery, such as a NiMh, NiCd, Li Ion, or Li Polymer cell battery wherein the thermodynamically closed electrochemical cell battery powers the mobile device during times of high current load requirements and the fuel cell powers the mobile device during lower current load requirements, such as steady state type conditions.

Steady state conditions may be those conditions wherein a specified characteristic of a condition, such as a value, rate, periodicity, or amplitude, exhibits only negligible change over a predetermined period of time. A steady state condition may exist after all initial transients or fluctuating conditions have damped out, and all currents, voltages, or fields remain essentially constant, or oscillate uniformly.

In another exemplary embodiment, power source 1104 may be comprised of a hybrid battery pack comprising a fuel cell and a thermodynamically closed electrochemical cell battery, such as a NiMh, NiCd, Li Ion, or Li Polymer cell battery wherein the fuel cell powers the mobile device during times of high current load requirements and the thermodynamically closed electrochemical cell battery powers the mobile device during lower current load requirements, such as steady state type conditions.

In another exemplary, power source 1104 may be comprised of a hybrid battery pack comprising a fuel cell which charges a thermodynamically closed electrochemical cell battery, such as a NiMh, NiCd, Li Ion, or Li Polymer cell battery.

In another exemplary, power source 1104 may be comprised of a hybrid battery pack comprising a fuel cell and a thermodynamically closed electrochemical cell battery, such as a NiMh, NiCd, Li Ion, or Li Polymer cell battery, wherein the fuel cell may be used to provide power to a mobile device subsystem 1 with relatively higher power requirements and the thermodynamically closed electrochemical cell battery is utilized to provide power to a mobile device subsystem 2 with relatively lower power requirements, such as subsystems that operate in more steady state type conditions.

In another exemplary embodiment, power source may be comprised of a hybrid battery pack 1104 comprising a fuel cell and a thermodynamically closed electrochemical cell battery, such as a NiMh, NiCd, Li Ion, or Li Polymer cell battery, wherein the fuel cell may be removed from the mobile device and placed into a charging station separate from the mobile device, at which time power for any onboard systems of the mobile device that need to continue in an "active" state (such as WiFi, GPS, etc) may be provided by the thermodynamically closed electrochemical cell battery.

In an exemplary embodiment, power source 1104 may be comprised of an energy storage system with a rapid or short charge cycle, such as an ultracapacitor, also known as a supercapacitor, pseudocapacitor, electrochemical double layer capacitor (EDLC) or electric double layer capacitor.

An exemplary ultracapacitor may be described and illustrated as an electrolyte suspended between two nonreactive porous electrodes (or plates or collectors) with a voltage potential applied across the collectors. In an individual ultracapacitor cell, the applied potential on a positive electrode attracts negative ions in the electrolyte, while the potential on the negative electrode attracts the positive ions. A dielectric separator between the two electrodes prevents charge from moving between the two electrodes.

As a storage device, the ultracapacitor relies on the microscopic charge separation at an electrochemical interface to store energy. Since the capacitance of these devices is proportional to the active electrode area, increasing the electrode surface area increase the capacitance, hence increasing the amount of energy that can be stored. High surface area is achieved by utilizing nanoporous material as the electrolyte, such as activated carbon or sintered metal powders. Use of nanoporous material results in an effective separation of charge despite the thin (on the order of nanometers) physical separation of the layers. The lack of need for a bulky layer of dielectric permits the packing of "plates" with much larger surface area into a given size, resulting in high capacitances in small packages.

Ultracapacitors have a high energy density when compared to common capacitors, typically on the order of thousands of times greater than a high capacity electrolytic capacitor. For example, a typical D-cell sized electrolytic capacitor will have a capacitance in the range of tens of millifarads. The same size electric double-layer capacitor would have a capacitance of several farads, an improvement of about two or three orders of magnitude in capacitance, but usually at a lower working voltage.

Ultracapacitors may not provide continuous energy for as long as thermodynamically closed electrochemical cell batteries, such as a NiMh, NiCd, Li Ion, or Li Polymer cell batteries, they may be charged faster. For example, an ultracapacitor may be charged in minutes or seconds as opposed to hours.

In an exemplary embodiment, power source 1104 may be comprised of a hybrid battery pack comprising an ultracapacitor and a thermodynamically closed electrochemical cell battery, such as a NiMh, NiCd, Li Ion, or Li Polymer cell battery connected to generate a single output voltage Vout.

In another exemplary embodiment, power source 1104 may be comprised of a hybrid battery pack comprising an ultracapacitor and a thermodynamically closed electrochemical cell battery, such as a NiMh, NiCd, Li Ion, or Li Polymer cell battery, wherein the thermodynamically closed electrochemical cell battery powers the mobile device during times of high current load requirements and the ultracapacitor provides power during lower current load requirements, such as steady state type conditions.

In another exemplary embodiment, power source 1104 may be comprised of a hybrid battery pack comprising an ultracapacitor and a thermodynamically closed electrochemical cell battery, such as a NiMh, NiCd, Li Ion, or Li Polymer cell battery, wherein the ultracapacitor powers the mobile device during times of high current load requirements and the thermodynamically closed electrochemical cell battery provides power during lower current load requirements, such as steady state type conditions.

In another exemplary embodiment, power source 1104 may be comprised of a hybrid battery pack comprised of an ultracapacitor which charges a thermodynamically closed electrochemical cell battery, such as a NiMh, NiCd, Li Ion, or Li Polymer cell battery.

In another exemplary embodiment, power source 1104 may be comprised of a hybrid battery pack comprising an ultracapacitor and a thermodynamically closed electrochemical cell battery, such as a NiMh, NiCd, Li Ion, or Li Polymer cell battery, wherein the ultracapacitor may be used to provide power to a mobile device subsystem with relatively high power requirements and the thermodynamically closed electrochemical cell battery is utilized to provide power to a mobile device subsystem with lower power requirements than subsystem, such as subsystems that operate in more steady state type conditions.

In another exemplary embodiment, power source 1104 may be comprised of a hybrid battery pack comprising an ultracapacitor and a thermodynamically closed electrochemical cell battery, such as a NiMh, NiCd, Li Ion, or Li Polymer cell battery, which charges an ultracapacitor. In most of retail wireless handheld scanner applications and transportation mobile device applications, only a short cycle operation time when the unit leaves the cradle. The ultracapacity may be sufficient for sustaining the entire short cycle operation without consuming energy from rechargeable battery thus prolong the life of battery.

In another exemplary embodiment, power source 1104 may be comprised of a hybrid battery pack comprising an ultracapacitor and a thermodynamically closed electrochemical cell battery, such as a NiMh, NiCd, Li Ion, or Li Polymer cell battery, and a fuel cell, which both fuel cell and battery charge an ultracapacitor. The priority sequence for charging is that battery charges the ultracapacity first. Upon battery is low, the fuel cell charges either battery in turn charging ultracapacity or to charge ultracapacity directly. In most of retail wireless handheld scanner applications and transportation mobile device applications, only a short cycle operation time when the unit leaves the cradle. The ultracapacity may be sufficient for sustaining the entire short cycle operation without consuming energy from rechargeable battery thus prolong the life of battery.

Mobile devices that perform certain business transactions may be generally at risk from being misused to perform unwanted activity. These devices may be designed with various security features that defend against this type of risk. One type of security feature is to require each user of the device to enter a user code, such as a personal identification number (PIN), along with other information as a pre-condition for using the device. The PIN and other transaction related information may be encrypted using a PIN encryption and/or cryptographic key which, if verified as correct, permits further operation of the device.

An exemplary mobile device may be a secure system that has requirements to erase security keys and certificates in the event the device is tampered with. Examples of secure systems include payment transaction processing systems, secure PIN blocks, personal identity modules, etc.

An exemplary secure system operates by placing security keys or certificates in battery backed or volatile memory. A tamper detection circuit may be placed between the battery and the memory where the security keys are stored. When the tamper detection circuit is broken power is removed from the memory, and the keys or certificates in volatile memory are erased which renders the mobile device, or certain functions of the mobile device unusable.

Referring to FIGS. 1c and 2, in an exemplary mobile device, sensitive electronics, such as the controller 4014 may be placed within an environmentally sealed perimeter or chamber 4010 with an environmental sensor 1400 that is connected to the power circuit 1100 or the controller 4014. A predetermined change (such as an increase in oxygen levels) in the environment within the secure perimeter will cause interruption or disconnection of power to the memory where sensitive data (i.e. security keys or certificates) is stored on an exemplary circuit board 4020, thereby erasing the sensitive data. One or more gaskets may be utilized to environmentally seal the chamber.

The chamber may be molded to have a limited number of egress points to provide water or environmental resistance. Gaskets may be utilized to render the chamber resistant to outside environmental influences.

Examples of environmental sensors are oxygen sensors, humidity sensors, temperature sensors, gas sensors, particulate matter sensors, etc.

In an exemplary embodiment, the secure environment may be subjected to a purge cycle with an inert gas to improve the environmental factor detection process, such as the detection of oxygen. In such a purge cycle, an inert gas (such as Helium (He), Neon (Ne), Nitrogen (N2), Argon (Ar), Krypton (Kr) or Xenon (Xe)) may be injected into the chamber to expel oxygen from the chamber to enhance sensitivity of the sensor to exposure to oxygen or other gases. The inert gas may be injected into the chamber prior to sealing it from the environment.

In an exemplary embodiment, a single environmental sensor is placed in the secure device. Predetermined changes in static environmental conditions may be used to detect a breach of the security perimeter. Once a breach is detected, the power is disrupted from the keys/certificates in volatile memory, and the sensitive data is erased.

FIG. 3 provides an exemplary flowchart 500 of operating a mobile device wherein power is provided from a battery to volatile memory in a step 510, the oxygen level is monitored in an environmentally sealed chamber in a step 520. A query is made if the oxygen level has changed in a step 530. If yes, power is disrupted to the volatile memory in a step 540. If not, the oxygen level monitoring continues.

In an exemplary embodiment, a disruption circuit is triggered by a change in sensor output and outputs a disruption signal to either a battery controller or other controller.

An exemplary mobile device comprises a housing adapted for hand held operation; a battery disposed in the housing for providing power to the mobile device; an environmentally sealed chamber disposed within the housing; a controller disposed in the environmentally sealed chamber for controlling the mobile device, the controller comprising volatile memory for storing data; a sensor disposed within the environmentally sealed chamber for detecting a change in the environment of the environmentally sealed chamber; wherein power is disrupted from the battery to the volatile memory when a predetermined change detected by the sensor occurs in the environment.

A exemplary mobile device comprises: a housing adapted for hand held operation; a battery disposed in the housing for providing power to volatile memory disposed in the housing; an environmentally sealed chamber disposed within the housing; a sensor disposed within the environmentally sealed chamber for detecting changes in the environment of the environmentally sealed chamber; a circuit to disrupt power from the battery to the volatile memory based on a predetermined environment change detected by the sensor.

An exemplary method of operating a mobile device comprises: disposing a battery in a housing adapted for hand held operation for providing power to volatile memory disposed in the housing; disposing an environmentally sealed chamber within the housing; disposing a sensor within the environmentally sealed chamber; utilizing the sensor to detect a change in the environment of the environmentally sealed chamber; a circuit to disrupt power from the battery to the volatile memory based on an environment change detected by the sensor.

Although some embodiments have been shown and described, it will be appreciated by those skilled in the art that changes may be made in these embodiments, the scope of which is defined in the claims and their equivalents.

The invention claimed is:

1. A mobile data collection device comprising:
a housing adapted for hand held operation;
a data collection system for capturing and processing data associated with RFIDs or images containing data, the data collection system disposed at least partially within the housing;
a battery disposed in the housing for providing power to the mobile device;
an environmentally sealed chamber disposed within the housing;
a controller disposed in the environmentally sealed chamber for controlling the mobile device, the controller comprising volatile memory for storing data;
a sensor disposed within the environmentally sealed chamber for detecting a change in the environment of the environmentally sealed chamber;
wherein power is disrupted only from the battery to the volatile memory when a predetermined change detected by the sensor occurs in the environment; and
whereby the disruption of the power from the battery to the volatile memory erases security credential information from the volatile memory rendering certain functions of the mobile device unusable until the security credential information is re-entered.

2. A mobile device in accordance with claim 1, wherein the controller controls the disruption in the power.

3. A mobile device in accordance with claim 1, further comprising a battery control circuit that controls the disruption in the power.

4. A mobile device in accordance with claim 1, wherein the environmental sensor comprises at least one of the following: an oxygen sensor; a humidity sensor; a temperature sensor; a gas sensor and a particulate matter sensor.

5. A mobile device in accordance with claim 1, wherein the environmentally sealed chamber is purged with an inert gas.

6. A mobile device in accordance with claim 1, wherein the change in environment is the result of the chamber seal being breached.

7. A mobile data collection device comprising:
a housing adapted for hand held operation;
a data collection system for capturing and processing data associated with RFIDs or images containing data, the data collection system disposed at least partially within the housing;
a battery disposed in the housing for providing power to volatile memory disposed in the housing;
an environmentally sealed chamber disposed within the housing;
a sensor disposed within the environmentally sealed chamber for detecting changes in the environment of the environmentally sealed chamber;
a circuit to disrupt power only from the battery to the volatile memory based on a predetermined environment change detected by the sensor;
whereby the disruption of the power from the battery to the volatile memory erases security credential information from the volatile memory rendering certain functions of the mobile device unusable until the security credential information is re-entered.

8. A mobile device in accordance with claim 7, wherein the environmental sensor comprises at least one of the following: an oxygen sensor; a humidity sensor; a temperature sensor; a gas sensor and a particulate matter sensor.

9. A mobile device in accordance with claim 7, wherein the environmentally sealed chamber is purged with an inert gas.

10. A mobile device in accordance with claim 7, wherein the environmental sensor comprises an oxygen sensor.

11. A mobile device in accordance with claim 7, wherein the change in environment is the result of the chamber seal being breached.

12. A method of operating a mobile data collection device comprising:
disposing a battery in a housing adapted for hand held operation for providing power to volatile memory disposed in the housing;
disposing a data collection system for capturing and processing data associated with RFIDs or images containing data at least partially within the housing;
disposing an environmentally sealed chamber within the housing;
disposing a sensor within the environmentally sealed chamber;
utilizing the sensor to detect a change in the environment of the environmentally sealed chamber;
utilizing a circuit to disrupt power only from the battery to the volatile memory based on an environment change detected by the sensor;
whereby the disruption of the power from the battery to the volatile memory erases security credential information from the volatile memory rendering certain functions of the mobile device unusable until the security credential information is re-entered.

13. A method of operating a mobile device in accordance with claim 12, wherein the environmental sensor comprises at least one of the following: an oxygen sensor; a humidity sensor; a temperature sensor; a gas sensor and a particulate matter sensor.

14. A method of operating a mobile device in accordance with claim 12, wherein the environmentally sealed chamber is purged with an inert gas.

15. A method of operating a mobile device in accordance with claim 12, wherein the environmental sensor comprises an oxygen sensor.

\* \* \* \* \*